Patented Apr. 15, 1941

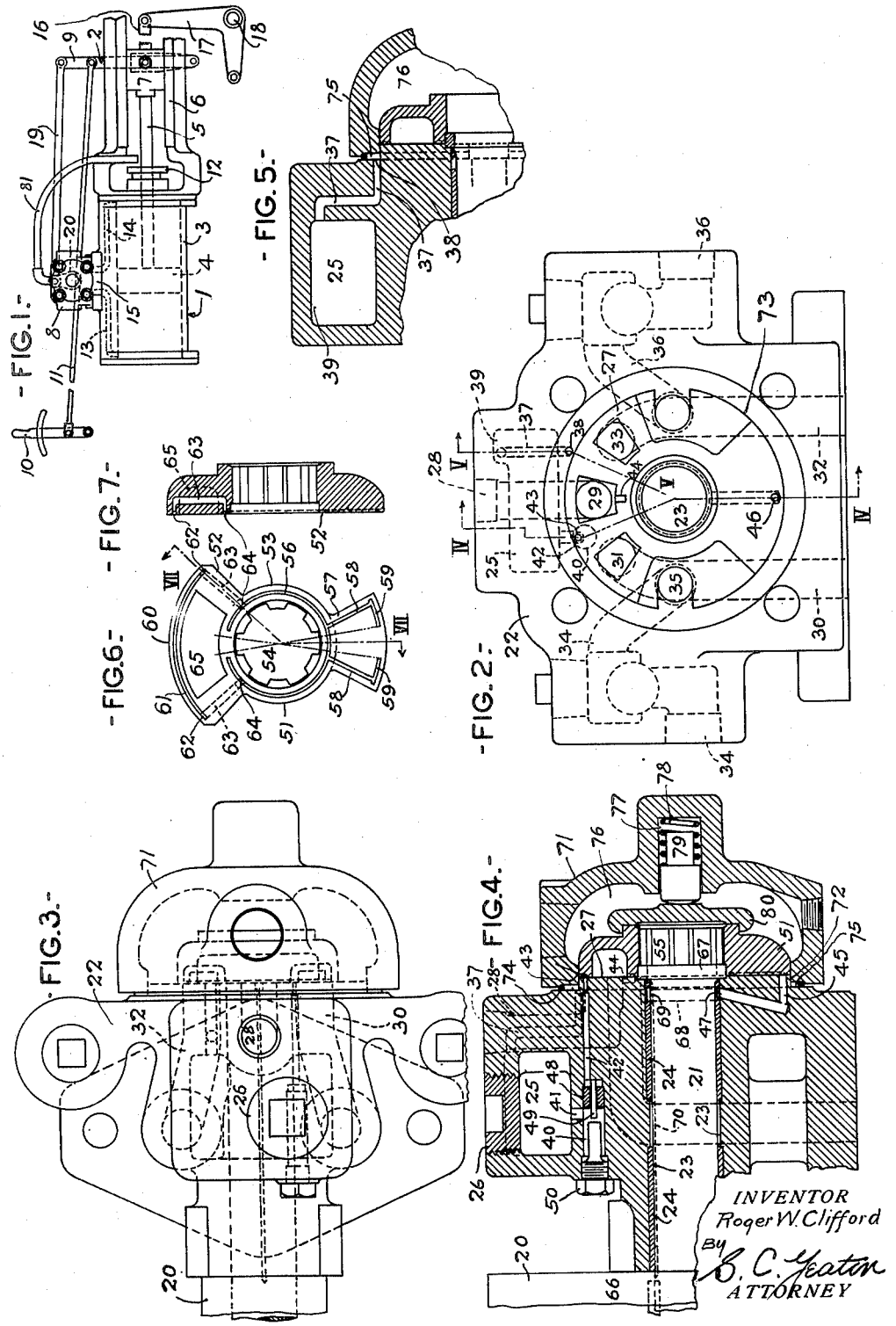

2,238,101

UNITED STATES PATENT OFFICE 2,238,101

SERVOMOTOR

Roger W. Clifford, Schenectady, N. Y., assignor to American Locomotive Company, New York, N. Y., a corporation of New York Application May 2, 1940, Serial No. 332,885

10 Claims. (Cl. 121—41)

This invention relates to a servomotor and more particularly to the type employed in the power reverse gear mechanism of a locomotive.

An object of the invention is to provide an improved lubricating system for a servomotor.

A further object is to provide, in a motor of the aforesaid type and wherein a swingable valve stem is employed, means whereby the stem will be lubricated each time that it swings.

A further object is to provide, in a servomotor, means whereby the piston rod of the motor piston, or some other mechanism, will be lubricated whenever an adjustment of the piston is made.

A further object is to provide a lubricating system as aforesaid for a power reverse gear in which, whenever a valve gear adjustment is made, the servomotor valve stem will be lubricated and thereafter the servomotor piston rod or other mechanism, if desired, will be lubricated.

Other and further objects of and advantages achieved by the present invention will be apparent from the following description of an approved embodiment thereof.

Referring to the drawing, Figure 1 is a diagrammatic view of a power reverse gear mechanism of a locomotive in connection with which the present invention is employed, parts being broken away; Fig. 2 is an enlarged front elevation of the servomotor valve, parts being omitted; Fig. 3 is a plan view of the valve of Fig. 2, parts being broken away; Fig. 4 is a section on the line IV—IV of Fig. 2, parts being broken away and other parts added; Fig. 5 is a fragmental section on the line V—V of Fig. 2; Fig. 6 is a rear elevation of a valve element; and Fig. 7 is a section on the line VII—VII of Fig. 6.

Referring to Fig. 1, the servomotor of the present invention, indicated generally by the reference numeral 1, is shown, by way of illustration, as part of a power reverse gear mechanism 2 of a locomotive. The following description will be of the embodiment shown, but it will be understood that the servomotor is a separate device which is suitable for a variety of other uses. The mechanism is comprised of the usual parts, as more fully set forth in my co-pending application Serial No. 302,654, filed November 3, 1939, which parts are the power cylinder 3, piston 4 disposed therein, piston rod 5 extending forwardly from said piston, crosshead guide 6 secured at the forward end of said cylinder, crosshead 7 disposed in said guide, valve 8 secured to said cylinder, floating lever 9 connected at its lower end to the crosshead, hand valve-operating lever 10 which would be disposed in the locomotive cab (not shown) and reach rod 11 extending between the levers. A gland 12 seals the cylinder from escape of air past the piston rod. The cylinder has the usual air passageways 13 and 14 extending from either end of the cylinder to a valve-seating boss 15 formed on the top of the cylinder, on which the valve is disposed. A reach rod 16 extends forwardly from the crosshead, and is connected at its forward end to an arm 17, which arm is operatively mounted on a valve gear reverse shaft 18. A reach rod 19 also extends rearwardly from the top of the floating lever to the top of an arm or crank 20, which is mounted at its lower end on a valve stem 21 forming part of the valve 8.

The valve 8 further includes a body 22 having a central transverse valve stem orifice 23 in which is disposed bearing means 24 for supporting the valve stem 21, an oil reservoir 25 having a filling opening at its top closed by a plug 26, a valve element seat 27 providing a ported face, and various air passageways and lubricating oil passageways.

The air passageway system of the valve body is similar on either side of the vertical transverse center plane thereof. Referring to Fig. 2, there is a central exhaust passageway 28 opening at one end through a port 29 in the upper center of the valve seat 27 and at the other end through the top of the valve body. A passageway 30 opens at one end through a port 31 in the valve seat 27 at the left of the exhaust passageway and at the other end through the bottom face of the valve, opposite and in communication with the adjacent end of the passageway 13. Similarly a passageway 32 opens at one end through a port 33 in the valve seat 27 at the right of the exhaust passageway and at the other end through the bottom face of the valve, opposite and in communication with the passageway 14. An air source passageway 34 opening at one end through a port 35 in the valve seat 27 at the left of the port 31 extends to the left side of the valve body and is connected at this end with a source of compressed air supply (not shown). A similar passageway 36 is formed in the right side of the body and serves for the same purpose as the passageway 34, only one being used however, depending on which is most convenient for the particular disposition of the valve. The one not made use of is closed by a plug (not shown) inserted in its end opening in the valve side.

Considering for the present purposes, that the source of air supply is connected up with the passageway 34, there are four active air ports formed in the face of the valve seat 27, namely ports 29, 31, 33 and 35, air for the valve passing through the port 35, air going to and from the rear side of the cylinder passing through the port 31, exhaust air passing through port 29, and air going to and from the forward side of the cylinder passing through port 33. The port of passageway 36 may for the present purposes of description of the valve, be disregarded. Ports 29, 31 and 33 are keystone-shaped to provide proper control edges.

The before-mentioned air passageways all are concerned with the operation of the piston in the cylinder. There is further an air passageway 37 leading from the valve seat 27, which it opens to by means of an opening 38, to the reservoir 25. The reservoir has an offset upper portion 39, best shown in Fig. 2, in which the passageway 37 opens. As the portion is above the remainder of the oil reservoir, the oil therein will be subjected to the pressure of the air admitted on top thereof, for a purpose later to be described.

The lubricating oil passageway system of the body includes, besides the reservoir 25, a transverse chamber 40 disposed below the reservoir 25 and connected thereto by a passage 41, a small passageway 42 leading from the top of the chamber 40 to the valve seat 27, to which it opens by means of a port 43, a recess, conveniently termed a port 44, formed in the valve seat 27, open at one end into the exhaust port 29, and extending downwardly therefrom, its lower end being closed, and a passageway 45 extending from the lower central portion of the valve seat 27, to which it opens by means of a port 46, to the orifice 23, to which it opens by means of a mouth 47.

The chamber 40 is relatively large and is divided at the inner end by an orificed block 48. A pin 49 is disposed in the orifice of the block with a small clearance. This clearance is the only means of passage for the oil from the reservoir to the passageway 42. It is kept free from foreign matter by the vibration of the pin, which vibration is caused by shocks passing through the servomotor due to the travel of the locomotive. The chamber is closed at its outer end by a plug 50, the inner end of which controls the extent of the outward movement of the pin. The chamber inner end wall controls the extent of the inward movement of the pin. To further limit the amount of oil passing through the oil passageways, the passageway 42 is constricted at its portion adjacent the valve seat 27, the port 43 thereby providing a relatively small opening.

A valve element 51 is disposed on the valve seat 27 with its face 52 in slidable engagement with the face of the seat. It is an integral structure having three distinct portions. The central portion 53 is circular and contains a splined orifice 54 for mounting the element on a splined enlarged head 55 of the valve stem 21. An oil groove 56 is formed in this portion opening in the face 52 and is continuous around the margin of the portion except at the top, where there is a part of the margin through which no portion of the groove extends. That is to say, the upper ends of the groove are spaced from each other providing therebetween an oil port closing face.

The lower portion 57 of the element is substantially wedge-shaped, the axis of the orifice 54 being the projected apex of the wedge triangle. It contains two downwardly extending grooves 58, one along its right margin, and one along its left margin, and two inwardly extending grooves 59 along its bottom margin, one adjacent the right side and one adjacent the left side. The adjacent inner ends of the grooves 59 are spaced from each other, providing therebetween an oil port closing face, and the outer ends are connected each with the bottom end of the adjacent groove 58. The upper ends of the grooves 58 are connected with the groove 56.

The upper portion 60 of the element is also substantially wedge-shaped, the axis of the orifice 54 being approximately at the projected apex of the wedge triangle. It contains an oil groove 61 around its upper margin. At each end of the groove 61 is an opening 62. Two passageways 63 extend one from each opening 62 to an opening 64, the openings 64 opening into the groove 56 one at each side of the element. The passageways 63 are closed except at the openings 62 and 64. The grooves 56, 59 and 61 are arcuate, having a common center which is at the axis of the orifice 23 and cooperate respectively with ports 44, 46 and 43. An exhaust recess 65 is also formed in the portion 60 and is of a length sufficient to lap the port 29 and either of ports 31 and 33, as the case may be, when the element is swung theretoward to a sufficient extent to permit the corresponding end of the cylinder to exhaust to the exterior.

The groove 61 is always in communication with the port 43 over which it is disposed. When the valve element is in central or normal position, the ends of the groove 56 are disposed adjacent but to the rear of the port 44, that is to say, each end is spaced from the port, one on either side thereof, so that rotation of the element a predetermined amount will move one or the other groove end until it is in communication with the port. Similarly, the adjacent ends of the grooves 59 are disposed to the rear of the port 46, each end being spaced from the port, one on either side thereof, and adapted to move forward into communication with the port, depending upon the direction in which the valve element is moved. The ports 44 and 46 remain closed by the element face until a groove is brought into communication therewith. Therefore the operation of these ports is timed in a predetermined manner.

The crank 20 is carried by the valve stem, which projects beyond the valve body, by means of a hub 66 which is keyed to the valve stem and has working clearance with the rear edge of the bearing means 24 and adjacent portion of the valve body. The valve stem passes through a ring 67 housed in adjacent shouldered portions formed in the valve body and valve element for centering the latter. The ring 67 has working clearance with adjacent relatively movable parts.

The bearing means 24 is shown in the present instance as formed of two spaced bushings, but one may be employed if desired. However the space provides a receptacle for a supply of oil. At the bearing means end adjacent the head 55 is formed an exterior annular groove 68. An opening 69 is formed in the groove at the top part of the bearing means, connecting the bottom of the groove with the inner bearing surface of the bearing means. The groove 68 is in communication at the bottom with the mouth 47. The bearing means is pressed in the orifice 23 so that it has no movement therein.

The valve stem is provided with a groove 70 extending along its upper center line from the head 55 to just outside of the valve body. This groove is in line with and communication with the opening 69.

A valve cap 71 is disposed over the valve element and sets in a shoulder 72 formed in the margin of the valve body adjacent the seat 27, the shoulder 72 forming a cylindrical portion 73. The cylindrical portion 73 is segmental, being cut away adjacent the port 35 and the similar port of passageway 36, as shown in Fig. 2. The jointure between the valve cap and valve body is made air-tight by a soft metal ring 74 which is compressed therebetween, the cap being bolted to the body in the usual manner as shown in Fig. 1. The ring also holds the cap slightly away from the valve body and thus forms an air passage 75 extending around the element. This passage is in communication with the opening 38 and, through said cut-away shouldered portions, with an air chest 76 formed by the space between the valve seat and the valve cap. At the center of the valve cap is a recess 77 in which is disposed a spring 78 and plunger 79, which bears against a valve follower 80 carried by the valve element, and urges the valve element into air-tight engagement with the valve seat.

The operation of the device is as follows: Considering the locomotive as running along in service, the valve element will be normally in central position and the piston 4 will be subjected to slight axial movements from time to time due to the weight and independent vibratory movements of the mechanism which the piston operates, such for instance, as the valve gear link (not shown) which is adjusted by the arm 17. When the piston moves, however slight, there is an accompanying swinging of the valve element and valve stem due to the connection between the valve stem and the floating lever. This movement of the valve element will open either of the ports 31 or 33 and connect the other with the exhaust recess 65, admitting air to one end of the cylinder, and exhausting air from the other end, thereby returning the piston to its former position and counteracting the movement due to the weight and vibration aforesaid.

The piston may be moved, as above described, either forwardly or rearwardly, depending on the direction of the forces, the setting of the valve gear, or other circumstances. Assuming that the piston is so moved rearwardly out of position, the valve element will move clockwise, opening port 31 to the air chest 76. Air will thereby pass to the rear of the piston through passageway 13. As aforesaid, it is an object of the invention to lubricate the valve stem during this movement, as otherwise the valve stem would soon become worn as the aforedescribed movement is frequent in service.

When the valve element moves, its face in contact with the valve seat 27 is lubricated by the oil in the grooves 56, 58, 59 and 61, so that no wear will occur. The oil in these grooves is under pressure due to the air pressure on top of the oil in the reservoir 25. The oil in these grooves comes from the reservoir through passage 41, chamber 40, past pin 49, through passageway 42 and port 43. From this port the oil enters groove 61. It passes to groove 56 by way of the passageways 63, and therefrom to grooves 58, and therefrom to grooves 59.

The clockwise movement of the element brings the inner end of the right hand groove 59 into communication with port 46. If the piston had moved the other way, the left hand groove 59 would have been moved into communication with port 46. Oil enters the port due to the air pressure and passes through passageway 45 to groove 68. From groove 68 it passes through opening 69 to groove 70 in the valve stem. Groove 70 distributes the oil evenly throughout the length of the valve stem and bearing means, providing lubrication therefor. Some oil passes beyond the valve body at one end to lubricate the engaging faces of the hub, bearing means and body portion, and some oil passes beyond the valve body at the other end to lubricate the ring 67 and the adjacent relatively movable parts. Therefore during the service movements of the piston due to valve gear weights and vibrations, the valve element face and valve stem and adjacent parts are well lubricated.

These aforesaid movements of the valve element are preferably not sufficient to bring either of the adjacent ends of groove 56 into communication with port 44, these groove ends being sufficiently spaced apart to provide for this. However, when it is desired to adjust the piston by the lever 10, as for instance to reverse the direction of the locomotive or to change the locomotive power cylinder events, the valve element will be moved far enough to bring one end or the other of groove 56 into communication with port 44. That is to say, in the embodiment shown in the drawing, when the valve gear cut-off is lengthened in forward movement or shortened in reverse movement of the locomotive, the left hand end of groove 56 communicates with port 44, and when the cut-off is shortened in forward movement or lengthened in reverse movement, the right hand end of groove 56 communicates with port 44. Oil will then be forced into the port 44 by the air pressure in reservoir 25. Whenever this communication between groove 56 and port 44 occurs, there will also be an exhaust of air from the end of the cylinder toward which the piston is moving. The exhaust air passes through either passageway 13 or 14, as the case may be, into the exhaust recess 65 and thereafter through the exhaust passageway 28. As the port 44 is in communication with the exhaust recess and the passageway 28, the exhaust air carries the oil from port 44 with it out of the valve, to the point to be lubricated. In the present instance this is shown to be the piston rod 5. The oil is conducted from the passageway 28 to the piston rod by a pipe 81, the exhaust air also traveling through the pipe, and the oil dripping or being sprayed therefrom directly on the piston rod. However, the pipe may lead to other parts, if desired, such for instance as to the crosshead guides.

It will be appreciated that whenever the piston is adjusted as aforedescribed, by the lever 10, both the valve stem and the piston rod are lubricated, one of the grooves 59 first coming into communication with port 46 and thereafter one or the other of the ends of groove 56 coming into communication with the port 44.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A servomotor comprising a cylinder; a compressed air-operated piston therein; working parts operated by said piston; a valve controlling the air to and from said cylinder, having a valve seat with air ports communicating with said cylinder, an exhaust port for air coming from said cylinder and a port for lubricating oil communicating with said exhaust port; a passageway communicating with said exhaust port and provided with an opening adjacent said working parts, said valve further having a valve element provided with a face engaging the face of said seat and slidably movable relative thereto for controlling all of said ports, said exhaust and lubricating oil ports being controlled to permit a simultaneous passage of oil and exhaust air through said passageway to said parts for lubricating same; and means for conveying lubricating oil under pressure to said faces and therebetween to said lubricating oil port when open.

2. A servomotor comprising a cylinder; a compressed air-operated piston therein; working parts operated by said piston; a valve controlling the air to and from said cylinder, having a valve seat with air ports communicating with said cylinder, an exhaust port for air coming from said cylinder and a port for lubricating oil, a valve stem and a bearing therefor; a passageway communicating with said oil port and provided with an opening adjacent said stem and bearing, said valve further having a swingable valve element secured on said stem whereby said stem swings with said element, said element being provided with a face engaging the face of said seat and being swingably slidably movable relative thereto for controlling all of said ports, said oil port being opened and closed when said exhaust port is opened and closed; and means for conveying lubricating oil under pressure to said faces and therebetween to said lubricating oil port when open for lubricating said stem and bearing during each swing of said valve element opening said oil port.

3. A servomotor comprising a working chamber for compressed air; a power piston in said chamber adjustable as to position therein by said air applied thereto at a side thereof; an exhaust control valve; passageway means for exhaust of air from the other side of said piston during an adjustment thereof, leading from said other side to and beyond said valve, said valve having a seat and a valve element, said element being provided with a face engaging the face of said seat for sliding movement relative thereto; means for slidably moving said element relative to said seat from exhaust passageway means closed position to exhaust passageway means open position during a piston adjustment; mechanism connected to said piston for operation thereof by said piston during an adjustment thereof; an oil port in said seat opening into said exhaust passageway means for supply of lubricating oil thereto, said port being closed by said element when in exhaust passageway means closed position; an oil groove in said element opening into said element face, communicating with said port during said element movement and disposed at the rear of said port when said exhaust passageway means is closed; and means for supplying lubricating oil under pressure to said groove and faces, said exhaust passageway means having an opening beyond said valve and adjacent working parts of said mechanism, whereby at each piston adjustment said parts will be lubricated by oil carried by said exhaust air.

4. A servomotor comprising a working chamber for compressed air; a power piston in said chamber adjustable as to position therein by said air applied thereto at a side thereof; an air control valve; passageway means for exhaust of air from the other side of said piston during an adjustment thereof, leading from said other side to said valve, said valve having a seat, a valve stem, a bearing therefor, and a swingable valve element carried on said stem, said stem being swingable with said element, said element being provided with a face engaging the face of said seat for sliding swinging movement relative thereto; means for swinging said element relative to said seat for air control during a piston adjustment; an oil port in said seat opening into its said face, closed by said element when in exhaust passageway means closed position; an oil passageway leading from said port to said bearing; an oil groove in said element opening into said element face, communicating with said port during said element movement and disposed at the rear of said port when said exhaust passageway means is closed; and means for supplying lubricating oil under pressure to said groove and faces, whereby at each piston adjustment said valve stem and bearing will be lubricated by oil forced through said oil passageway.

5. A servomotor comprising a working chamber for compressed air; a power piston in said chamber adjustable as to position therein by said air applied thereto at a side thereof; an air control valve; passageway means for exhaust of air from the other side of said piston during an adjustment thereof, leading from said other side to said valve, said valve having a seat, a valve stem, a bearing therefor, and a swingable valve element carried on said stem, said stem being swingable with said element, said element being provided with a face engaging the face of said seat for sliding swinging movement relative thereto; means for swinging said element relative to said seat for air control during a piston adjustment; mechanism connected to said piston for operation thereof by said piston during an adjustment thereof, said mechanism being subject to independent movement after a piston adjustment, said mechanism including means connected to said element for returning said element to exhaust passageway means closed position during a piston adjustment, said element and said stem being thereby rendered swingably responsive to said independent movement of said mechanism; an oil port in said seat opening into its said face, closed by said element when in exhaust passageway means closed position; an oil passageway leading from said port to said bearing; an oil groove in said element opening into said element face, communicating with said port during said element movement and disposed in spaced relation to said port when said exhaust passageway means is closed; and means for supplying lubricating oil under pressure to said groove and faces, whereby at each piston adjustment, and during each element and valve stem movement responsive to a corresponding mechanism independent movement, said valve stem and bearing will be lubricated by oil forced through said oil passageway.

6. A servomotor comprising a working chamber for compressed air; a power piston in said chamber adjustable as to position therein by said air applied thereto at a side thereof; an exhaust control valve; passageway means for exhaust of air from the other side of said piston during an adjustment thereof, leading from said other side to and beyond said valve, said valve having a seat, a valve stem, a bearing therefor, and a swingable valve element carried on said stem, said stem being swingable with said element, said element being provided with a face engaging the face of said seat for sliding swinging movement relative thereto; means for swinging said element relative to said seat from exhaust passageway means closed position to exhaust passageway means open position during a piston adjustment; mechanism connected to said piston for operation thereof by said piston during an adjustment thereof; an oil port in said seat opening into said exhaust passageway means for supply of lubricating oil thereto; another oil port in said seat, said ports being closed by said element when in exhaust passageway means closed position; an oil passageway leading from said last mentioned oil port to said bearing; an oil groove in said element opening into said element face, communicating with said ports during said element movement and disposed at the rear of said ports when said exhaust passageway means is closed; and means for supplying lubricating oil under pressure to said groove and faces, said passageway means having an opening beyond said valve and adjacent working parts of said mechanism, whereby at each piston adjustment said valve stem and bearing will be lubricated by oil forced through said oil passageway and said parts will be lubricated by oil carried by said exhaust air.

7. A servomotor comprising a working chamber for compressed air; a power piston in said chamber adjustable as to position therein by said air applied thereto at a side thereof; an exhaust control valve; passageway means for exhaust of air from the other side of said piston during an adjustment thereof, leading from said other side to and beyond said valve, said valve having a seat, a valve stem, a bearing therefor, and a swingable valve element carried on said stem, said stem being swingable with said element, said element being provided with a face engaging the face of said seat for sliding swinging movement relative thereto; means for swinging said element relative to said seat from exhaust passageway means closed position to exhaust passageway means open position during a piston adjustment; mechanism connected to said piston for operation thereof by said piston during an adjustment thereof; an oil port in said seat opening into said exhaust passageway means for supply of lubricating oil thereto; another oil port in said seat, said ports being closed by said element when in exhaust passageway means closed position; an oil passageway leading from said last mentioned oil port to said bearing; an oil groove in said element opening into said element face, communicating with said last mentioned oil port during said element movement and disposed a predetermined distance to the rear of said last mentioned oil port when said exhaust passageway means is closed; another oil groove in said element opening into said element face, communicating with said first mentioned oil port during said element movement and disposed a predetermined distance, greater than said first mentioned predetermined distance, to the rear of said first mentioned oil port when said exhaust passageway means is closed; and means for supplying lubricating oil under pressure to said groove and faces, said exhaust passageway means having an opening beyond said valve and adjacent working parts of said mechanism, whereby at each piston adjustment said valve stem and bearing will be first lubricated by oil forced through said oil passageway and thereafter said parts will be lubricated by oil carried by said exhaust air.

8. A servomotor comprising a working chamber for compressed air; a power piston in said chamber adjustable as to position therein by said air applied thereto at a side thereof; an exhaust control valve; passageway means for exhaust of air from the other side of said piston during an adjustment thereof, leading from said other side to and beyond said valve, said valve having a seat, a valve stem, a bearing therefor, and a swingable valve element carried on said stem, said stem being swingable with said element, said element being provided with a face engaging the face of said seat for sliding swinging movement relative thereto; means for swinging said element relative to said seat from exhaust passageway means closed position to exhaust passageway means open position during a piston adjustment; mechanism connected to said piston for operation thereof by said piston during an adjustment thereof, said mechanism being subject to independent movement after a piston adjustment, said mechanism including means connected to said element for returning said element to exhaust passageway means closed position during a piston adjustment, said element and said stem being thereby rendered swingably responsive to said independent movement of said mechanism; an oil port in said seat opening into said exhaust passageway means for supply of lubricating oil thereto; another oil port in said seat, said ports being closed by said element when in exhaust passageway means closed position; an oil passageway leading from said last mentioned oil port to said bearing; an oil groove in said element opening into said element face, communicating with said ports during said element movement and disposed at the rear of said ports when said exhaust passageway means is closed; and means for supplying lubricating oil under pressure to said grooves and faces, said exhaust passageway means having an opening beyond said valve and adjacent working parts of said mechanism, whereby at each piston adjustment, and during each element and valve stem movement responsive to a corresponding mechanism independent movement, said valve stem and bearing will be lubricated by oil forced through said oil passageway, and said parts, upon opening of said first mentioned port, will be lubricated by oil carried by said exhaust air.

9. A servomotor comprising a working chamber for compressed air; a power piston in said chamber adjustable as to position therein by said air applied thereto at a side thereof; an exhaust control valve; passageway means for exhaust of air from the other side of said piston during an adjustment thereof, leading from said other side to and beyond said valve, said valve having a seat, a valve stem, a bearing therefor, and a swingable valve element carried on said stem, said stem being swingable with said element, said element being provided with a face engaging the face of said seat for sliding swinging movement relative thereto; means for swinging said element relative to said seat from exhaust passageway means closed position to exhaust passageway means open position during a piston adjustment; mechanism connected to said piston for operation thereof by said piston during an adjustment thereof, said mechanism being subject to independent movement after a piston adjustment, said mechanism including means connected to said element for returning said element to exhaust passageway means closed position during a piston adjustment, said element and said stem being thereby rendered swingably responsive to said independent movement of said mechanism; an oil port in said seat opening into said exhaust passageway means for supply of lubricating oil thereto; another oil port in said seat, said ports being closed by said element when in exhaust passageway means closed position; an oil passageway leading from said last mentioned oil port to said bearing; an oil groove in said element opening into said element face, communicating with said last mentioned oil port during said element movement and disposed a predetermined distance to the rear of said last mentioned oil port when said exhaust passageway means is closed; another oil groove in said element opening into said element face, communicating with said first mentioned oil port during said element movement and disposed a predetermined distance, greater than said first mentioned predetermined distance, to the rear of said first mentioned oil port when said exhaust passageway means is closed; and means for supplying lubricating oil under pressure to said grooves and faces, said exhaust passageway means having an opening beyond said valve and adjacent working parts of said mechanism, whereby at each piston adjustment, and during each element and valve stem movement responsive to a corresponding mechanism independent movement, said valve stem and bearing will first be lubricated by oil forced through said oil passageway and thereafter, and upon opening of said first mentioned port, said parts will be lubricated by oil carried by said exhaust air.

10. A servomotor comprising a working chamber for compressed air; a power piston in said chamber adjustable as to position therein by said air applied thereto at a side thereof; an exhaust control valve; passageway means for exhaust of air from the other side of said piston during an adjustment thereof, leading from said other side to and beyond said valve, said valve having a seat, a valve stem, a bearing therefor, and a swingable valve element carried on said stem, said stem being swingable with said element, said element being provided with a face engaging the face of said seat for sliding swinging movement relative thereto; means for swinging said element relative to said seat from exhaust passageway means closed position to exhaust passageway means open position during a piston adjustment; mechanism connected to said piston for operation thereof by said piston during an adjustment thereof, said mechanism being subject to independent movement after a piston adjustment, said mechanism including means connected to said element for returning said element to exhaust passageway means closed position during a piston adjustment, said element and said stem being thereby rendered swingably responsive to said independent movement of said mechanism; an oil port in said seat opening into said exhaust passageway means for supply of lubricating oil thereto; another oil port in said seat, said ports being closed by said element when in exhaust passageway means closed position; an oil passageway leading from said last mentioned oil port to said bearing; an oil groove in said element opening into said element face, communicating with said ports during said element movement and disposed a predetermined distance to the rear of said last mentioned oil port, and a greater distance to the rear of said first mentioned oil port, when said exhaust passageway means is closed; and means for supplying lubricating oil under pressure to said groove and faces, said exhaust passageway means having an opening beyond said valve and adjacent working parts of said mechanism, whereby at each piston adjustment, and during each element and valve stem movement responsive to a corresponding mechanism independent movement, said valve stem and bearing will be first lubricated by oil forced through said oil passageway and thereafter, and upon opening of said first mentioned port, said parts will be lubricated by oil carried by said exhaust air.

ROGER W. CLIFFORD.